United States Patent
Xin et al.

(10) Patent No.: US 11,090,876 B2
(45) Date of Patent: Aug. 17, 2021

(54) ASSEMBLY OF SUB-COMPONENTS BY COMPRESSION MOLDING

(71) Applicant: Flex Ltd., Singapore (SG)

(72) Inventors: Rui Xin, Zhuhai (CN); Weineng Jiang, Zhuhai (CN); Sebastien Ignotis, Zhuhai (CN); Yu Tang, Shenzhen (CN)

(73) Assignee: Flex Ltd., Signapore (SG)

(*) Notice: Subject to any disclaimer, the term of this patent is extended or adjusted under 35 U.S.C. 154(b) by 0 days.

(21) Appl. No.: 16/534,762

(22) Filed: Aug. 7, 2019

(65) Prior Publication Data
US 2020/0086585 A1    Mar. 19, 2020

Related U.S. Application Data

(60) Provisional application No. 62/732,690, filed on Sep. 18, 2018.

(30) Foreign Application Priority Data

Jul. 17, 2019 (CN) .......................... 201910644556.7

(51) Int. Cl.
*B29C 65/70* (2006.01)
*B29C 65/00* (2006.01)
(Continued)

(52) U.S. Cl.
CPC ............ *B29C 65/70* (2013.01); *B29C 43/146* (2013.01); *B29C 43/203* (2013.01); *B29C 66/71* (2013.01);
(Continued)

(58) Field of Classification Search
CPC ........ B29C 66/73921; B29C 2043/147; B29C 69/02; B29C 45/14336; B29L 2001/00
(Continued)

(56) References Cited

U.S. PATENT DOCUMENTS 3,122,598 A    2/1964  Berger
3,547,741 A *  12/1970 Hewitt .............. B29C 66/81429
                                                156/579
(Continued)

FOREIGN PATENT DOCUMENTS

JP    2004-268936       9/2004
WO    2004-41532 A1     5/2004
(Continued)

OTHER PUBLICATIONS

Jeng, M.-C. et al., Rapid Mold temperature Control In Injection Molding By Using Steam Heating, International Communications in Heat and MAss transfer, vol. 37(2010), pp. 1295-1304.
(Continued)

*Primary Examiner* — Scott W Dodds
(74) *Attorney, Agent, or Firm* — Haverstock & Owens LLP

(57) ABSTRACT

A thermoplastic composite component assembly and method of manufacturing the thermoplastic composite component assembly is disclosed. The thermoplastic composite component assembly is manufactured by first performing a molding step to form individual assembly features as discrete assembly feature components, and separately forming a thermoplastic composite component using a first compression molding step. Then, a reprocessing step is performed where the discrete assembly feature components are integrated with the thermoplastic composite component using a second compression molding step. The reprocessing step essentially "welds" the discrete assembly feature components to the thermoplastic composite component at each of a plurality of desired assembly feature sites.

14 Claims, 2 Drawing Sheets

(51) Int. Cl.
  *B29C 43/14* (2006.01)
  *B29C 43/20* (2006.01)
(52) U.S. Cl.
  CPC .. *B29C 66/83221* (2013.01); *B29C 2043/147* (2013.01)
(58) Field of Classification Search
  USPC ........ 156/228, 245, 293; 264/248, 249, 250, 264/266
  See application file for complete search history.

(56) References Cited

U.S. PATENT DOCUMENTS

| | | | |
|---|---|---|---|
| 5,536,344 A * | 7/1996 | van Dreumel | B29C 65/0672 156/257 |
| 6,574,096 B1 | 6/2003 | Difonzo et al. | |
| 6,620,371 B1 | 9/2003 | Winget et al. | |
| 6,699,349 B1 | 3/2004 | Sporle et al. | |
| 6,768,654 B2 | 7/2004 | Arnold et al. | |
| 7,003,267 B2 | 2/2006 | Ward et al. | |
| 8,367,210 B2 | 2/2013 | Naritomi et al. | |
| 8,552,292 B2 | 10/2013 | Qin et al. | |
| 8,681,485 B2 | 3/2014 | Du et al. | |
| 8,858,854 B2 | 10/2014 | Oin | |
| 9,156,198 B2 | 10/2015 | Qin et al. | |
| 2002/0048667 A1 | 4/2002 | Kauppi et al. | |
| 2006/0257624 A1 | 11/2006 | Naritomi et al. | |
| 2007/0048470 A1 | 3/2007 | Zadesky et al. | |
| 2009/0186758 A1 | 7/2009 | Ukpabi | |
| 2009/0260871 A1 | 10/2009 | Weber et al. | |
| 2016/0339611 A1 * | 11/2016 | Bartel | B29C 43/18 |

FOREIGN PATENT DOCUMENTS

| | | |
|---|---|---|
| WO | 2004-415532 A1 | 5/2004 |
| WO | 2005-109984 A2 | 11/2005 |

OTHER PUBLICATIONS

Wang, G. et al., Research of Thermal Response Simulation and Mold Structure Optimization for Rapid Heat Cycle Molding Processes, Respectively, With Steam Heating and Electric Heating, Materials and Design, vol. 31 (2010), pp. 382-395.

* cited by examiner

ASSEMBLY OF SUB-COMPONENTS BY COMPRESSION MOLDING

RELATED APPLICATIONS

This patent application claims priority under 35 U.S.C. 119(e) of the U.S. provisional patent application, Application Ser. No. 62/732,690, filed on Sep. 18, 2018, and entitled "Assembly of Sub-Components by Compression Molding", which is hereby incorporated in its entirety by reference. This patent application also claims priority of the co-pending Chinese patent application, Application Serial No. 201910644556.7, filed on Jul. 17, 2019, and entitled "Assembly of Sub-Components by Compression Molding", which is hereby incorporated in its entirety by reference.

FIELD OF THE INVENTION

The present invention is generally directed to the field of thermoplastic composites. More specifically, the present invention is directed to the assembly of thermoplastic composite sub-components by a compression molding process to make fully functional or cosmetic parts.

BACKGROUND OF THE INVENTION

Thermoforming is a manufacturing process where a thermoformable material is heated to a sufficient temperature that permits the heated thermoformable material to be molded, such as by injection molding, and cooled to a finished shape. An advantage of manufacturing using thermoformable materials is that they can be processed using heat.

A thermoformable composite material is a combination of a fiber reinforcement and a resin matrix. The resin matrix can be a thermoset material or a thermoplastic material. A thermoplastic composite is a combination of thermoplastic material, referred to as a thermoplastic resin or thermoplastic resin matrix, and a reinforcement material, such as individual fibers or fabric made of fibers. Example fiber materials include, but are not limited to, carbon, glass, aramid, polyester, jute, cellulose, and cotton. An example thermoplastic composite is a continuous fiber reinforced thermoplastic (CFRT). A thermoplastic material, including a thermoplastic composite, can be reformed, or re-processed, after the material is already shaped. Example thermoplastic materials include, but are not limited to, polycarbonate (PC), formable PET (polyethylene terephthalate), polyamide, polyphenylene sulfide, polyether keton, and ether ketone. A thermoset composite is the combination of a thermoset material, referred to as a thermoset resin or thermoset resin matrix, with a reinforcement material. A thermoset material, including a thermoset composite, cannot be reshaped after having been cured, even after heating. Example thermoset materials include, but are not limited to, polyester and epoxy.

In many applications, it is desired to make a sub-assembly that is the assembly of a thermoformed composite component and an additional component. Assembly of such components can be achieved by adhesive bonding or mechanical joints. In the case of a thermoset composite, once the thermoset composite component is formed it is difficult to further process, such as bonding to another component. A thermoset composite can be used though to make integral assembly features for mechanical joints because thermoset resin is a low viscosity liquid, which works well to wet complicated 3D fiber reinforcement necessary for forming such mechanical joints in the thermoset composite component. Examples of such assembly features include, but are not limited to, studs, fasteners, or threaded inserts. Although effective for integrally forming assembly features on the thermoset composite component, thermoset materials have longer cycle times, less material choices, and higher costs than thermoplastic materials. Accordingly, thermoplastic materials, and thermoplastic composite components, are becoming more widespread. However, with thermoplastic materials, it is difficult to use a 3D fiber reinforcement necessary for forming integral assembly features on a thermoplastic composite component. In particular, it is difficult to make integral assembly features, such as a protruding stud, with normal compression molding processes used in the manufacturing of thermoplastic composite components. To make the mechanical joining of the thermoplastic composite component to another component feasible, one can make a threaded hole in the thermoplastic composite component, but sometimes the hole may break the surface continuity of the fiber reinforcement, and also generate weak points in the thermoplastic composite component. To attach an assembly feature like a stud, fastener, or threaded insert to the thermoplastic composite component it is not as easy as simply drilling a hole. Some processes are developed to attached an assembly feature to a thermoplastic composite component.

Since thermoplastic composites can be reprocessed, for example over-molded, after a thermoplastic composite component is formed, assembly features can be added after forming the thermoplastic composite component. For example, after the thermoplastic composite is formed, an over-mold process can be performed to add assembly features. One conventional process for adding assembly features to an already formed thermoplastic composite component is to individually add each new assembly features using an injection molding process at each new assembly feature site. A mold for each new assembly feature is positioned against the thermoplastic composite component at each of the assembly feature sites, and injection molding material is injected into each mold, which bonds to the thermoplastic composite component. However, in applications with many new assembly features to be added this can be a very time consuming and inefficient process. Another conventional process for adding new assembly features to an already formed thermoplastic composite component is to place the formed thermoplastic composite component into a tool, and then perform a back-injection process to form any desired assembly features. A disadvantage of such a back-injection process is that there is a lot of wasted material necessary to form the assembly features, this wasted material also adds weight to the thermoplastic composite component.

The back-injection process is a form of injection molding. The thermoplastic composite component is formed with a back-injection input opening and a web of channels extending from the single input opening to each of the sites on the thermoplastic composite component where assembly features are to be formed. There is an output opening in the thermoplastic composite component at each assembly feature site. A large mold having a plurality of individual molds, one corresponding to each assembly feature and aligned with a corresponding output opening in the thermoplastic composite component, is positioned over the thermoplastic composite component Injection molding material is injected into the input opening and distributed through the channels to each of the output openings where injection molding material is injected into each individual mold. The injection molding material injected into each individual mold forms one of the assembly features. However, the injection molding material present in the channels extending from the input opening to the output openings is wasted material. The further apart the assembly features are from each other, the more injection molding material that is wasted.

Other conventional processes have been developed for adding assembly features to a thermoplastic composite component. EP 0903216A2 discloses over-molding of a steel insert with claws which can be anchored in a thermoplastic composite component. In U.S. Pat. No. 6,682,675B1, a co-molding process of a thermoplastic material with a thermoplastic sandwich material is disclosed. The molded article can be easily attached to another article like a car body. In U.S. Pat. No. 8,197,624B2, a welding process is disclosed. This process joins a thermoplastic polymer and a thermosetting polymer composite component which has a thermoplastic surface layer together by using a high frequency vibration. In U.S. Pat. No. 9,180,681B2, a cylindrical insert, which has a circumferential groove, is molded in a thermoplastic composite compression molding, the groove surrounded by the thermoplastic composite forms mechanical interlock to retain the insert in the thermoplastic composite. In U.S. Pat. No. 9,302,434B2, thermoplastic prepreg flakes are used to make a composite component with molded inserts. In U.S. Pat. No. 9,586,362B2, a thermoplastic welding apparatus is disclosed, which uses an induction coil and at least one smart susceptor. In U.S. Pat. No. 9,610,654B1, a method and apparatus are disclosed for joining thermoplastic composite parts, which use some conformable induction coils embedded in a number of elastomeric sheets. In U.S. Pat. No. 9,770,892B2, a device to weld two thermoplastic composite parts together is disclosed, which use a two-side inductor and a field absorber.

In general, conventional processes to make a thermoplastic composite component with assembly features first make the thermoplastic composite component and then perform an overmolding process to add the assembly features. Although there are many different ways to attach different features for assembly, there is no conventional process for direct attachment of a nut or screw using compression molding.

SUMMARY OF THE INVENTION

Embodiments are directed to a thermoplastic composite component assembly and method of manufacturing the thermoplastic composite component assembly. The thermoplastic composite component assembly is manufactured by first performing a molding step to form the individual assembly features as discrete assembly feature components, and separately forming a thermoplastic composite component using a first compression molding step. Then, a reprocessing step is performed where the discrete assembly feature components are integrated with the thermoplastic composite component using a second compression molding step. The reprocessing step essentially "welds" the discrete assembly feature components to the thermoplastic composite component at each of a plurality of desired assembly feature sites. This eliminates the need to individually add each assembly feature by a site specific injection molding process and eliminates the waste material associated with a back-injection process.

In an aspect, a method of manufacturing a thermoplastic composite component assembly is disclosed. The method comprises manufacturing a discrete assembly feature component, manufacturing a discrete thermoplastic composite component; aligning the assembly feature component with an assembly feature site on the thermoplastic composite component, and applying heat and compression to bond the assembly feature component to the thermoplastic composite component at the assembly feature site to form the thermoplastic composite component assembly. In some embodiments, manufacturing the thermoplastic composite component comprises performing a compression molding process to a thermoplastic composite material. In some embodiments, the compression molding process comprises applying heat and compression to the thermoplastic composite material. In some embodiments, the thermoplastic composite component has a molded shape. In some embodiments, the thermoplastic composite component comprises a plurality of thermoplastic composite layers, and manufacturing the thermoplastic composite component further comprises performing a pre-consolidation process to form laminated thermoplastic composite layers, and performing the compression molding process comprises performing the compression molding process to the laminated thermoplastic composite layers to form the thermoplastic composite component. In some embodiments, each thermoplastic composite layer comprises a thermoplastic material and a fibrous reinforcement. In some embodiments, applying heat and compression comprises applying a compression molding process. In some embodiments, the assembly feature component includes a thermoplastic layer at a distal end, and aligning the assembly feature component with the assembly feature site on the thermoplastic composite component comprises placing the thermoplastic layer at the distal end of the assembly feature component against the thermoplastic composite component, and applying the compression molding process melts the thermoplastic layer to bond the distal end of the assembly feature component with the thermoplastic composite component at the assembly feature site. In some embodiments, the assembly feature component comprises one of a stud, a fastener, or a threaded insert. In some embodiments, the assembly feature component comprises a threaded insert, and the threaded insert comprises a thread insert and thermoplastic layer coupled to the thread insert. In some embodiments, the threaded insert has a threaded hole exposed at a first end of the threaded insert, and the thermoplastic layer forms a cap over a second end of the threaded insert. In some embodiments, the cap of the threaded insert is positioned against the thermoplastic composite component, and applying heat and pressure melts the cap to bond with the thermoplastic composite component at the assembly feature site. In some embodiments, the method further comprises manufacturing a plurality of the discrete assembly feature components, aligning each of the plurality of assembly feature components with a corresponding assembly feature site on the thermoplastic composite component, and applying heat and compression to bond each of the plurality of assembly feature components to the thermoplastic composite component at each of the corresponding assembly feature sites. In some embodiments, applying heat and compression comprises applying a compression molding process to simultaneously bond each of the plurality of assembly feature components to the thermoplastic composite component at each of the corresponding assembly feature sites. In some embodiments, aligning each of the plurality of assembly feature components with a corresponding assembly feature site on the thermoplastic composite component comprises positioning each of the plurality of assembly feature components in a corresponding cavity within a compression molding tool and positioning the thermoplastic composite component into a holding location in the compression molding tool.

In another aspect, a thermoplastic composite component assembly is disclosed. The thermoplastic composite component assembly comprises a thermoplastic composite component, and an assembly feature component compression molded to the thermoplastic composite component. In some embodiments, the thermoplastic composite component has a molded shape. In some embodiments, the thermoplastic composite component comprises a plurality of thermoplastic composite layers laminated together. In some embodiments, the assembly feature component includes a thermoplastic layer at a distal end, and the thermoplastic layer at the distal end of the assembly feature component is bonded to the thermoplastic composite component at the assembly feature site. In some embodiments, the assembly feature component comprises one of a stud, a fastener, or a threaded insert.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a thermoplastic composite component assembly and method of manufacturing. Those of ordinary skill in the art will realize that the following detailed description of the thermoplastic composite component assembly and method of manufacturing is illustrative only and is not intended to be in any way limiting. Other embodiments of the thermoplastic composite component assembly and method of manufacturing will readily suggest themselves to such skilled persons having the benefit of this disclosure.

Reference will now be made in detail to implementations of the thermoplastic composite component assembly and method of manufacturing as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The thermoplastic composite component assembly includes one or more assembly features integrally formed with the thermoplastic composite component although the one or more assembly features and the thermoplastic composite component are initially manufactured separately as discrete components. An assembly feature is a mounting feature that enables the thermoplastic composite component assembly to be assembled, mounted, connected, joined, attached, or similarly coupled (collectively referred to as "assembled") to another discrete component having a complementary assembly feature.

Figure 1:
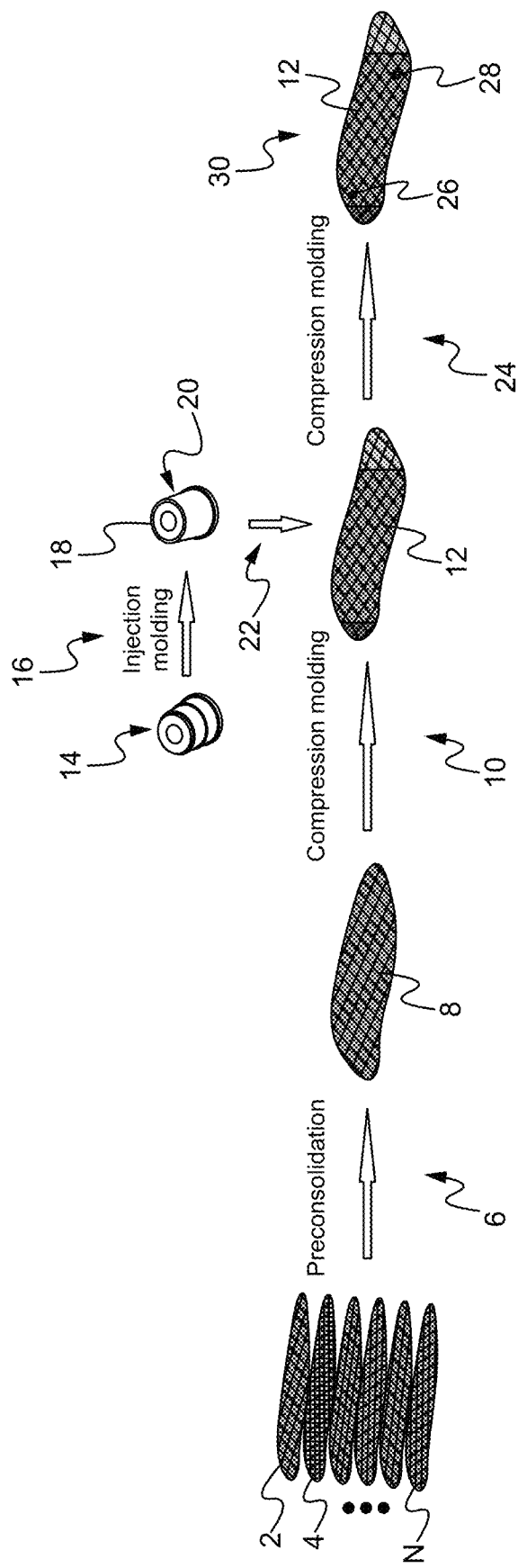
FIG. 1 illustrates an exemplary manufacturing process for making a thermoplastic composite component assembly according to some embodiments.

In the manufacturing process used to make the thermoplastic composite component assembly, the discrete assembly feature components are manufactured separately from the manufacturing of the thermoplastic composite component. The separately manufactured assembly feature components are then integrally combined with the thermoplastic composite component using a compression molding process. FIG. 1 illustrates an exemplary manufacturing process for making a thermoplastic composite component assembly according to some embodiments. A thermoplastic composite component can be made using one or more discrete thermoplastic composite layers combined together. Each thermoplastic composite layer is a combination of thermoplastic material and a reinforcement material of the types previously described. In the exemplary process shown in FIG. 1, N thermoplastic composite layers are used. In some embodiments, each thermoplastic composite layer is made of fabric-thermoplastic prepreg (fibrous reinforcement in the form of a fabric) or unidirectional thermoplastic prepreg (fibrous reinforcement made of individual fibers aligned in a single direction).

In a step 6, the N thermoplastic composite layers are laminated together through pre-consolidation to form laminated thermoplastic composite layers 8. In a pre-consolidation process, all layers of the composite are not fully pressed together, they just form one loosely attached preform to ease the operation in compression process. In some embodiments, lamination is done using heat and pressure to bond together the N thermoplastic composite layers. At a step 10, a first compression molding process is performed on the laminated thermoplastic composite layers 8, using a first compression molding tool, under suitable pressure and temperature to form a thermoplastic composite component 12 having a molded shape. The pressure is controlled by the molding tool and related machinery, and the temperature is a function of the composite material property. In some embodiments, the first compression molding tool is a different tool than that used for the lamination performed in step 6. Separately from manufacturing the thermoplastic composite component 12, discrete assembly feature components are manufactured. In an exemplary embodiment, one or more of the assembly feature components is a molded thread insert. Subsequent description is based on such a molded thread insert. It is understood that alternative types of assembly feature components can be manufactured and used, such as studs, fasteners, or other types of thread inserts. The molded thread insert can be made by first obtaining a thread insert part 14 and then over-molding the thread insert part 14 with a thermoplastic layer 18, such as by using an injection molding process at a step 16. It is understood that alternative conventional over-molding processes can be used to form the thermoplastic layer 18 over the thread insert 14. The result is a molded thread insert, shown as an assembly feature component 20.

Figure 2:
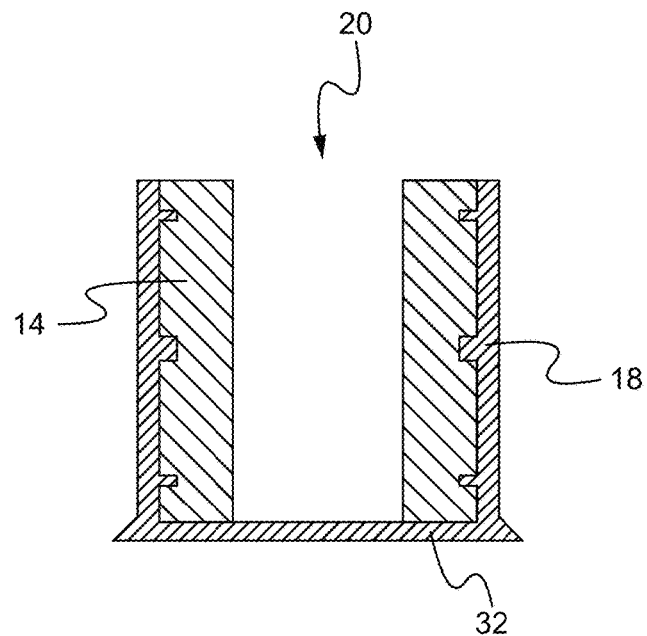
FIG. 2 illustrates a cut-out side view of the molded threaded insert.

FIG. 2 illustrates a cut-out side view of the molded thread insert 20. The over-molded thermoplastic layer 18 embeds the thread insert 14. At one end of the thread, a hole of the thread insert 14 is open, and at the other end, there is an extra thermoplastic material 32 that forms a cap. The extra thermoplastic material 32 is a base of the molded thread insert 20, where the base is positioned against an assembly feature site on the thermoplastic composite component. In some embodiments, a thickness of the extra thermoplastic material is in range of 0.5-2 mm. It is understood that thicknesses less than 0.5 mm and greater than 2 mm can be used. To enhance the bonding strength of the base to the underlying thermoplastic composite component 12, the base of the molded thread insert can have a round corner or a chamfer with bigger diameter than the main body.

Figure 3:
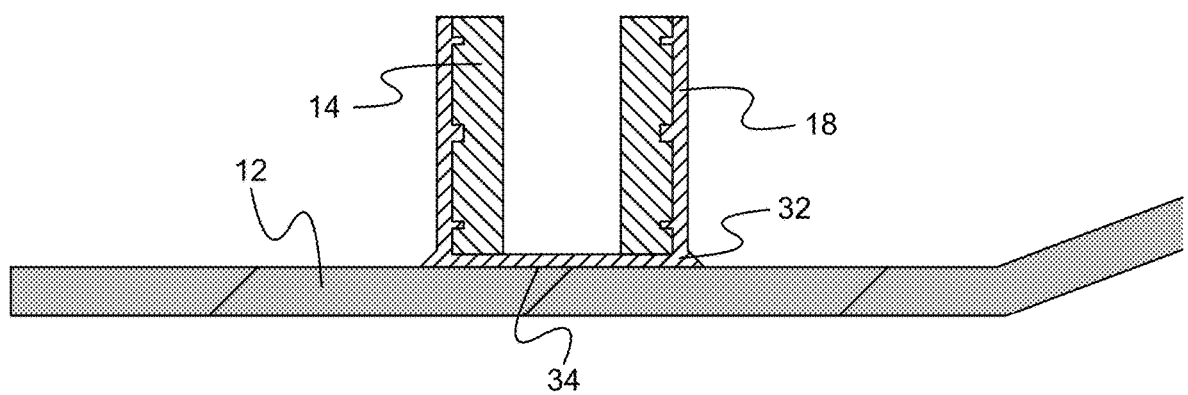
FIG. 3 illustrates a cut-out side view of the molded thread insert bonded to the thermoplastic composite component.

Returning to FIG. 1, at a step 22, one or more of the manufactured assembly feature components 20 are positioned on corresponding assembly feature sites of the thermoplastic composite component 12. In some embodiments, a second compression tool is used for bonding the assembly feature components 20 to the thermoplastic composite component 12. The discrete assembly feature components 20 are placed in the second compression tool along with the already formed thermoplastic composite component 12. The second compression tool is configured for the already formed thermoplastic composite component 12 to be positioned in a specific first location and alignment, and with specifically located cavities corresponding to each assembly feature site. Each cavity is configured to receive a corresponding one of the discrete assembly feature components 20. At a step 24, once the second compression tool is loaded with the already formed thermoplastic composite component 12 in the first location and the discrete assembly feature components 20 in the cavities, the second compression tool is heated to a specific temperature, and compression is applied to compress each discrete feature component 20 to the thermoplastic composite component 12 at each assembly feature site. As related to the exemplary molded thread insert 20, the extra thermoplastic material 32 is bonded to the thermoplastic composite component 12. FIG. 3 illustrates a cut-out side view of the molded thread insert 20 bonded to the thermoplastic composite component 12. As shown in FIG. 3, the base of the molded thread insert 20 formed by the extra thermoplastic material 32 is bonded to the thermoplastic composite component 12 at an assembly feature site 34. At each assembly feature site, the thermoplastic material at the interface between each discrete assembly feature component and the thermoplastic composite material used to form the thermoplastic composite component melts, or reflows, which when cooled essentially "welds" each discrete assembly feature component to the thermoformed thermoplastic composite component. An aspect of this process is to manage the amount of thermoplastic material at each feature site interface to control the welding. Another aspect of this process is to precisely control the temperature applied to the assembly feature components 20 and the thermoplastic composite component 12 to enable bonding of each assembly feature component 20 to the thermoplastic composite component 12 while maintaining the integrity of the thermoplastic composite component 12. To assure the success of the bonding process, the thermoplastic layer of the molded thread insert should have compatibility with the thermoplastic resin matrix of the thermoplastic composite component. The interface area between the molded thread insert and the composite also determines the bonding force. In an exemplary application, nine layers of carbon fiber thermoplastic prepreg are used, the thermoplastic resin matrix of the thermoplastic composite is polycarbonate and the thermoplastic used to over-mold the thread insert is also polycarbonate. The thread insert size of the molded thread insert is ISO M4×0.7, the outer diameter is 6 mm, and the over-molded thermoplastic layer diameter surrounding the thread insert is 10 mm. Tested bonding force between such a molded thread insert and thermoplastic composite component is higher than 1000 Newton.

The present application has been described in terms of specific embodiments incorporating details to facilitate the understanding of the principles of construction and operation of the thermoplastic composite component assembly and method of manufacturing. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of manufacturing a thermoplastic composite component assembly, the method comprising:
   a. manufacturing a discrete assembly feature component, wherein the assembly feature component comprises one of a stud, a fastener, or a threaded insert;
   b. manufacturing a discrete thermoplastic composite component having an outer surface that is an outer surface of a completed thermoplastic composite component assembly;
   c. aligning the assembly feature component with an assembly feature site on the outer surface of the thermoplastic composite component, and positioning the assembly feature component in contact with the outer surface of the thermoplastic composite component at the assembly feature site; and
   d. applying heat and compression in a compression molding process to bond the assembly feature component to the outer surface of the thermoplastic composite component at the assembly feature site to form the completed thermoplastic composite component assembly with the assembly feature component attached at and extending outward from the outer surface of the completed thermoplastic composite component assembly.

2. The method of claim 1 wherein the compression molding process comprises applying heat and compression to the thermoplastic composite material.

3. The method of claim 2 wherein the thermoplastic composite component has a molded shape.

4. The method of claim 1 wherein the thermoplastic composite component comprises a plurality of thermoplastic composite layers, and manufacturing the thermoplastic composite component further comprises performing a pre-consolidation process to form non-molded laminated thermoplastic composite layers, and performing the compression molding process comprises performing a first compression molding process to the laminated thermoplastic composite layers to form the thermoplastic composite component, wherein the assembly feature component is subsequently aligned and positioned on the formed thermoplastic composite component and bonded to the formed thermoplastic composite component using a second compression molding process separate from the first compression molding process.

5. The method of claim 4 wherein each thermoplastic composite layer comprises a thermoplastic material and a fibrous reinforcement.

6. The method of claim 1 wherein the assembly feature component includes a thermoplastic layer at a distal end, and aligning the assembly feature component with the assembly feature site on the thermoplastic composite component comprises placing the thermoplastic layer at the distal end of the assembly feature component against the thermoplastic composite component, and applying the compression molding process melts the thermoplastic layer to bond the distal end of the assembly feature component with the thermoplastic composite component at the assembly feature site.

7. The method of claim 1 wherein the assembly feature component comprises a threaded insert, and the threaded insert comprises a thread insert and thermoplastic layer coupled to the thread insert.

8. The method of claim 7 wherein the threaded insert has a threaded hole exposed at a first end of the threaded insert, and the thermoplastic layer forms a cap over a second end of the threaded insert.

9. The method of claim 8 wherein the cap of the threaded insert is positioned against the thermoplastic composite component, and applying heat and pressure melts the cap to bond with the thermoplastic composite component at the assembly feature site.

10. The method of claim 1 further comprising manufacturing a plurality of the discrete assembly feature components, aligning each of the plurality of assembly feature components with a corresponding assembly feature site on the thermoplastic composite component, and applying heat and compression to bond each of the plurality of assembly feature components to the thermoplastic composite component at each of the corresponding assembly feature sites.

11. The method of claim 10 wherein applying heat and compression comprises applying a compression molding process to simultaneously bond each of the plurality of assembly feature components to the thermoplastic composite component at each of the corresponding assembly feature sites.

12. The method of claim 11 wherein aligning each of the plurality of assembly feature components with a corresponding assembly feature site on the thermoplastic composite component comprises positioning each of the plurality of assembly feature components in a corresponding cavity within a compression molding tool and positioning the thermoplastic composite component into a holding location in the compression molding tool.

13. The method of claim 4 wherein aligning the assembly feature component with an assembly feature site on the outer surface of the thermoplastic composite component comprises loading the formed thermoplastic composite component in a compression tool that includes a first location into which is positioned the formed thermoplastic composite component and a cavity into which is positioned the assembly feature component, and applying heat and compression using the compression tool to reflow a thermoplastic layer at a distal end of the assembly feature component that bonds with the thermoplastic composite component at the assembly feature site.

14. A method of manufacturing a thermoplastic composite component assembly, the method comprising:
   a. manufacturing a discrete assembly feature component that includes a thermoplastic layer at a distal end, wherein the assembly feature component comprises one of a stud, a fastener, or a threaded insert;
   b. manufacturing a discrete thermoplastic composite component having an outer surface that is an outer surface of a completed thermoplastic composite component assembly;
   c. aligning the assembly feature component with an assembly feature site on the outer surface of the thermoplastic composite component, and positioning the assembly feature component in contact with the outer surface of the thermoplastic composite component at the assembly feature site by placing the thermoplastic layer at the distal end of the assembly feature component against the thermoplastic composite component; and
   d. applying heat and compression in a compression molding process to bond the assembly feature component to the outer surface of the thermoplastic composite component at the assembly feature site to melt the thermoplastic layer at the distal end of the assembly feature component to bond the distal end of the assembly feature component with the thermoplastic composite component at the assembly feature site to form the completed thermoplastic composite component assembly with the assembly feature component attached at and extending outward from the outer surface of the completed thermoplastic composite component assembly.

\* \* \* \* \*